(12) United States Patent
Centen et al.

(10) Patent No.: US 8,872,951 B2
(45) Date of Patent: Oct. 28, 2014

(54) METHOD AND SYSTEM FOR OPERATING AN IMAGE DATA COLLECTION DEVICE

(75) Inventors: Petrus Gijsbertus Maria Centen, Goirle (NL); Jeroen Rotte, Breda (NL)

(73) Assignee: GVBB Holdings S.A.R.L., Luxembourg (LU)

( * ) Notice: Subject to any disclaimer, the term of this patent is extended or adjusted under 35 U.S.C. 154(b) by 424 days.

(21) Appl. No.: 13/321,449

(22) PCT Filed: Apr. 28, 2010

(86) PCT No.: PCT/EP2010/055750
§ 371 (c)(1),
(2), (4) Date: Jan. 24, 2012

(87) PCT Pub. No.: WO2010/133429
PCT Pub. Date: Nov. 25, 2010

(65) Prior Publication Data
US 2012/0120292 A1   May 17, 2012

(30) Foreign Application Priority Data

May 18, 2009   (EP) .................................... 09305448

(51) Int. Cl.
| | | |
|---|---|---|
| H04N 3/14 | (2006.01) | |
| H04N 5/335 | (2011.01) | |
| H04N 5/378 | (2011.01) | |
| H04N 5/374 | (2011.01) | |
| H04N 5/357 | (2011.01) | |

(52) U.S. Cl.
CPC ............... *H04N 3/155* (2013.01); *H04N 5/378* (2013.01); *H04N 3/1568* (2013.01); *H04N 5/374* (2013.01); *H04N 5/3575* (2013.01)
USPC ........................................................ 348/301

(58) Field of Classification Search
USPC .......................................................... 348/301
See application file for complete search history.

(56) References Cited

U.S. PATENT DOCUMENTS 6,476,864 B1   11/2002   Borg
6,753,912 B1   6/2004   Wayne
(Continued)

FOREIGN PATENT DOCUMENTS

| EP | 0933928 A2 | 8/1999 |
|---|---|---|
| JP | 2011266403 A | 9/1999 |

(Continued)

OTHER PUBLICATIONS

International Search Report for International Application No. PCT/EP2010/055750, mailed Jun. 18, 2010, 2 pages.

(Continued)

*Primary Examiner* — Albert Cutler
(74) *Attorney, Agent, or Firm* — Arent Fox LLP (57) ABSTRACT

In accordance with an exemplary embodiment of the present invention, a method is provided to form an image using an active pixel sensor imager (108). The method includes placing an active pixel sensor (202) in electrical contact with a column readout line (204), lacing a sample-and-hold capacitor into electrical contact with the column readout line, and placing the sample-and-hold capacitor (314 or 320) in electrical contact with an input capacitor (324 or 334) on an amplifier (222). All of the input capacitor (324 or 334), the sample-and-hold capacitor (314 or 320), and the active pixel sensor (202) are in electrical contact for an overlapping period of time. A differential output (228) from the amplifier (222) is digitized, and used to form an image.

10 Claims, 6 Drawing Sheets

(56) References Cited

U.S. PATENT DOCUMENTS

| | | | |
|---|---|---|---|
| 7,525,080 B2 * | 4/2009 | Barna et al. | 250/208.1 |
| 2002/0105012 A1 | 8/2002 | Hua | |
| 2009/0174816 A1 * | 7/2009 | Hellman et al. | 348/553 |

FOREIGN PATENT DOCUMENTS

| | | | |
|---|---|---|---|
| JP | 2000201299 A | 7/2000 | |
| JP | 2006203665 A | 8/2006 | |
| JP | 2008306405 A | 12/2008 | |
| JP | 2009044458 A | 2/2009 | |

OTHER PUBLICATIONS

Notice of Reasons for Rejection dated Dec. 3, 2013, regarding Japan Application No. JP 2012-511222.

International Preliminary Report on Patentability dated Nov. 22, 2011 and Written Opinion dated Jun. 18, 2010, regarding PCT/EP2010/055750.

* cited by examiner

METHOD AND SYSTEM FOR OPERATING AN IMAGE DATA COLLECTION DEVICE

CROSS-REFERENCE TO RELATED APPLICATIONS

This application is a United States National Stage Application under 35 U.S.C. §371 of International Patent Application No. PCT/EP2010/055750, filed Apr. 28, 2010, which claims the benefit of European Application No. 09305448.4, filed May 18, 2009, each of which is incorporated by reference into this application as if fully set fourth herein.

The present invention relates to the field of image collection systems. In particular, exemplary embodiments of the present invention relate to a method and system for increasing the signal-to-noise from an image collection device.

Multi-pixel image collection elements used in cameras and other systems, such as charge-coupled devices or CCD arrays, may be expensive and may consume large amounts of power. Further, the output from a CCD array is not generally compatible with complementary metal oxide semiconductors, or CMOS, which may require signal processing to use the output. Accordingly, image sensors based on CMOS circuitry have gained acceptance in many applications. In a CMOS detector, analog circuitry associated with each pixel is generally used to amplify the signal obtained from a light sensor prior to transmitting the signal. Along with the pixel itself, this circuitry is termed an active pixel sensor, or APS. An imaging device based on active pixel sensors may be termed an APS imager. However, APS imagers may have significant interferences caused by noise from the circuitry itself. A number of techniques have been developed to cope with this noise.

For example, U.S. Pat. No. 6,753,912 to Wayne, purports to disclose a circuit for reducing noise in CMOS APS imagers using an amplifier termed a self-compensating correlated double sampling, or CDS, circuit. Each column in a pixel sensor has a CDS amplifier connected to the common column line. A scanning circuit then sequentially places each APS in the column into contact with the amplifier by selecting the APS using a row select switch. In the amplifier, a reference voltage is alternately selected with a signal from each APS placing each voltage onto sample and hold capacitors that feed an amplifier. The difference between the reference voltage and the signal is then measured by the amplifier, resulting in an amplified signal output that may be lower in noise from the column readout circuitry.

U.S. Patent Publication 20020105012, by Hua, also purports to disclose a noise reduction amplifier for amplifying signals obtained from an APS. Each column in the APS imager has a noise reduction amplifier connected to the common column line. A scanning circuit then sequentially connects each APS in the column into contact with the noise reduction amplifier by selecting the APS using a row select switch. Two signals are sequentially provided to the noise reduction amplifier from each APS. A first signal has the voltage from the APS after a light signal has been measured. The APS is then reset, and a second signal is provided corresponding to the voltage on the cell after reset. The output signal may be measured as a difference between each signal from the APS. However, while this compensates for 1/f-noise from the APS, it does not necessarily compensate for fixed pattern noise caused by capacitance effects from the column readout circuitry and may even double the APS reset noise. Accordingly, a voltage reference may be connected by a switch to the column line from the APS to assist in compensating for this fixed pattern noise. The voltage reference may be combined with the voltage from the APS, providing a final output value of $V_{out} = V_{dark} - V_{light} + V_{ref}$.

Further, U.S. Pat. No. 6,476,864, to Borg et al., purports to disclose a noise reducing amplifier for amplifying signals from an APS. The noise reducing amplifier comprises two double sampling circuits in parallel. The first double sampling circuit measures a difference between an image signal and a reference voltage. The second double sampling circuit measures a difference between a reference signal provided by a generally inactive column of pixels and a reference voltage. The two difference signals make up a difference image signal, which is provided to an analog-to-digital converter. The inactive column of pixels provides a reference signal that may compensate for crosstalk-noise generated by the APS imager, while the reference voltage may compensate for capacitance effects from the column readout circuitry.

An improved method and system noise reduction of an image signal from a detector is desirable.

A method of forming an image using an active pixel sensor imager according to the invention is set forth in claim 1. The method comprises placing an active pixel sensor in electrical contact with a column readout line, placing a sample-and-hold capacitor into electrical contact with the column readout line, and placing the sample-and-hold capacitor in electrical contact with an input capacitor on an amplifier. The input capacitor, the sample-and-hold capacitor, and the active pixel sensor are all in electrical contact for an overlapping period of time. A differential output from the amplifier is digitized and an image is formed from the digitized output.

In an embodiment of the method, the active pixel sensor may charge the sample-and-hold capacitor and the input capacitor during the period of time. In embodiments, the period of time may be greater than 500 ns. Placing the active pixel sensor in electrical contact with the column readout line comprises activating a CMOS FET that is operatively coupled between the active pixel sensor and the column readout line, allowing current to flow between the active pixel sensor and the column readout line.

Embodiments of the method may include displaying the image on a display incorporated into an image collection device. Other embodiments of the method may include transferring the image to an external device through a network interface controller.

Another exemplary embodiment of the present invention provides an image collection system that includes an optical system configured to focus an image on a detector, wherein the detector is configured to convert the image into image data. The optical system also includes a memory configured to store the image data for processing, a processor configured to perform calculations on the stored image data, and a second memory comprising machine readable instructions. The machine readable instructions may be configured to direct the processor to place an active pixel sensor in electrical contact with a column readout line, place a sample-and-hold capacitor into electrical contact with the column readout line, and place the sample-and-hold capacitor in electrical contact with an input capacitor on an amplifier, wherein the input capacitor, the sample-and-hold capacitor, and the active pixel sensor are all in electrical contact for a period of time. The machine readable instructions may also be configured to direct the processor to digitize a differential output from the amplifier and form an image from the digitized output.

In an embodiment, the detector may include an active pixel sensor imager. Further, in embodiments, the image collection system may include a network interface controller configured to transfer images to an external device. The image collection system may also include a digital image storage device, which may include a disk drive, a recordable optical disk, a digital tape, or any combinations thereof.

A preferred embodiment of the present invention is described with reference to the accompanying drawings. The preferred embodiment merely exemplifies the invention. Plural possible modifications are apparent to the skilled person. The gist and scope of the present invention is defined in the appended claims of the present application.

In accordance with an exemplary embodiment of the present invention, a method and a system is provided to enhance the signal-to-noise ratio of a voltage representing a pixel in an active pixel sensor, or APS. The enhanced signal-to-noise may provide a better image under certain ambient conditions, such as in low light. The method involves forming an electrical connection between the APS, a sample-and-hold capacitor, and an amplifier input capacitor. The electrical connection overlaps in time, allowing the APS to charge both capacitors simultaneously. Accordingly, the signal is not attenuated by being divided between the capacitors.

Figure 1:
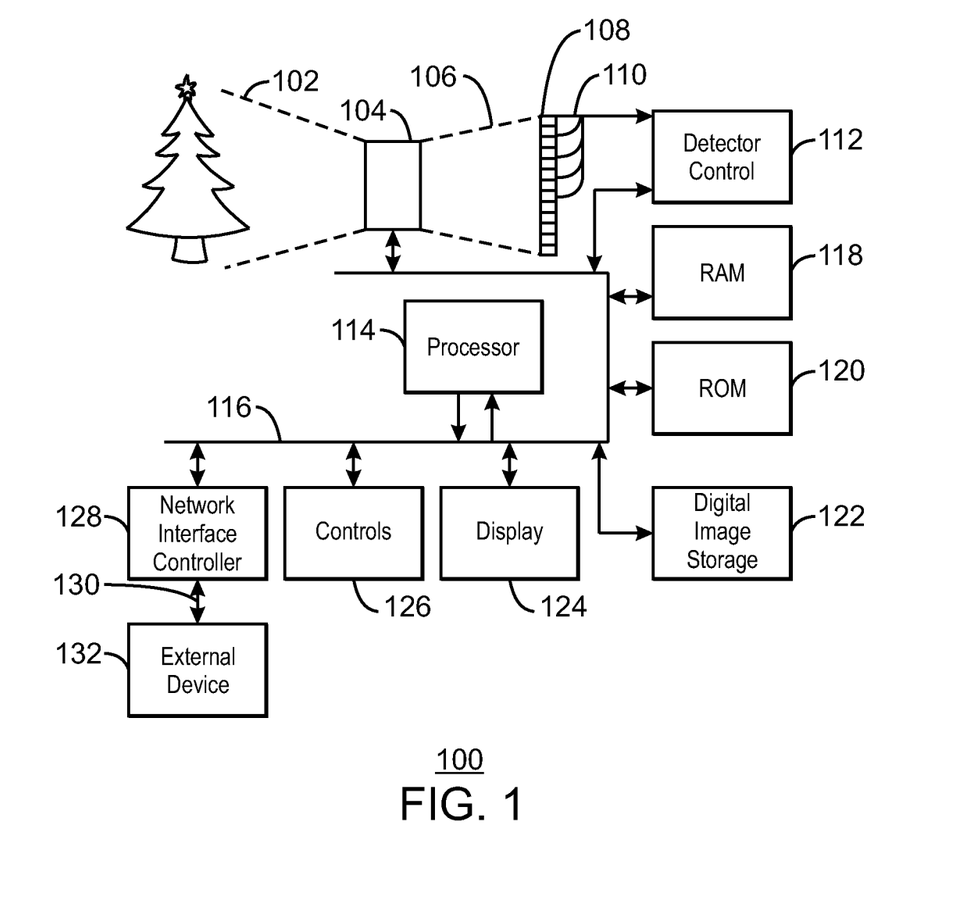
FIG. 1 is a block diagram of an image collection device, in accordance with an exemplary embodiment of the present invention.

In accordance with an exemplary embodiment of the present invention, an image collection device, such as a digital camera, a digital video camera, or an electronic imaging system using a CMOS detector may be used to collect an image. For example, FIG. 1 is a block diagram of an image collection device 100 that may be used in exemplary embodiments of the present invention. In FIG. 1, light 102 reflected from a scene is collected and focused by optical elements 104.

The focused light 106 is projected onto a detector 108, which may be, for example, a CMOS APS imager. The focused light 106 is converted by the detector 108 into an electrical signal and is then transferred over signal lines 110 to a detector controller 112. In the detector controller 112, the individual signals from the detector 108 are converted into a digital image using an ADC. The digital image may then be transferred by a processor 114 over a bus 116 to a random access memory, or RAM, 118 for further processing. The RAM 118 may be a DRAM, an SRAM, a flash memory module, or any other kind of memory unit capable of high speed access.

The optical elements 104 may be tied to the bus 116 to allow the processor 114 to control the optical elements 104. For example, the processor 114 may adjust the focus, the f-stop, or other properties of the optical elements 104 through the bus 116.

The processor 114 may be controlled by image collection and processing programs contained in a read only memory, or ROM 120, that is accessible from the bus 116. The programs do not have to be in a ROM 120, but may be contained in any type of long term memory unit, such as a disk drive, a flash card, or an EEPROM, among others. The programs in the ROM 120 may include the pixel readout scheme discussed with respect to FIGS. 6-8.

The digital image may be stored before or after processing in a separate digital image storage 122, such as a digital video tape, a recordable optical disk, a hard drive, and the like. The digital image storage 122 may also be combined with the program storage. For example, a flash disk drive may be used both to store both programs and digital images.

The images may be displayed during or after collection on a display unit 124 that may be tied to the bus 116. Controls 126 may also be connected to the bus 116 to control the collection and processing of the image by the processor 114. Such controls 126 may include keypads, selection knobs, and separate buttons for functions such as zooming, focusing, and starting the collection of images, among others.

Images may be transferred from the image collection device 100 through a network interface controller, or NIC 128, that may be tied to the bus 116. The NIC 128 may be connected to an external LAN 130, which may be used to transfer the images, either before or after processing, to an external device 132 located on the LAN 130.

The arrangement of the functional blocks presented above is only one possible arrangement, and any number of other arrangements may be used. For example, the NIC 128 may be directly coupled to an area of the RAM 118 to allow direct memory access, or DMA, transfers to occur directly to and from the RAM 118 of the digital collection device. This may accelerate data transfer when a large amount of data is involved, such as in a high definition digital video camera. Further, in other arrangements the controls 126 and display 128 may be combined into a single unit. In yet other combinations, the display 128 may be directly tied to the detector controller 112 to off-load the display function from the processor 114.

Figure 2:
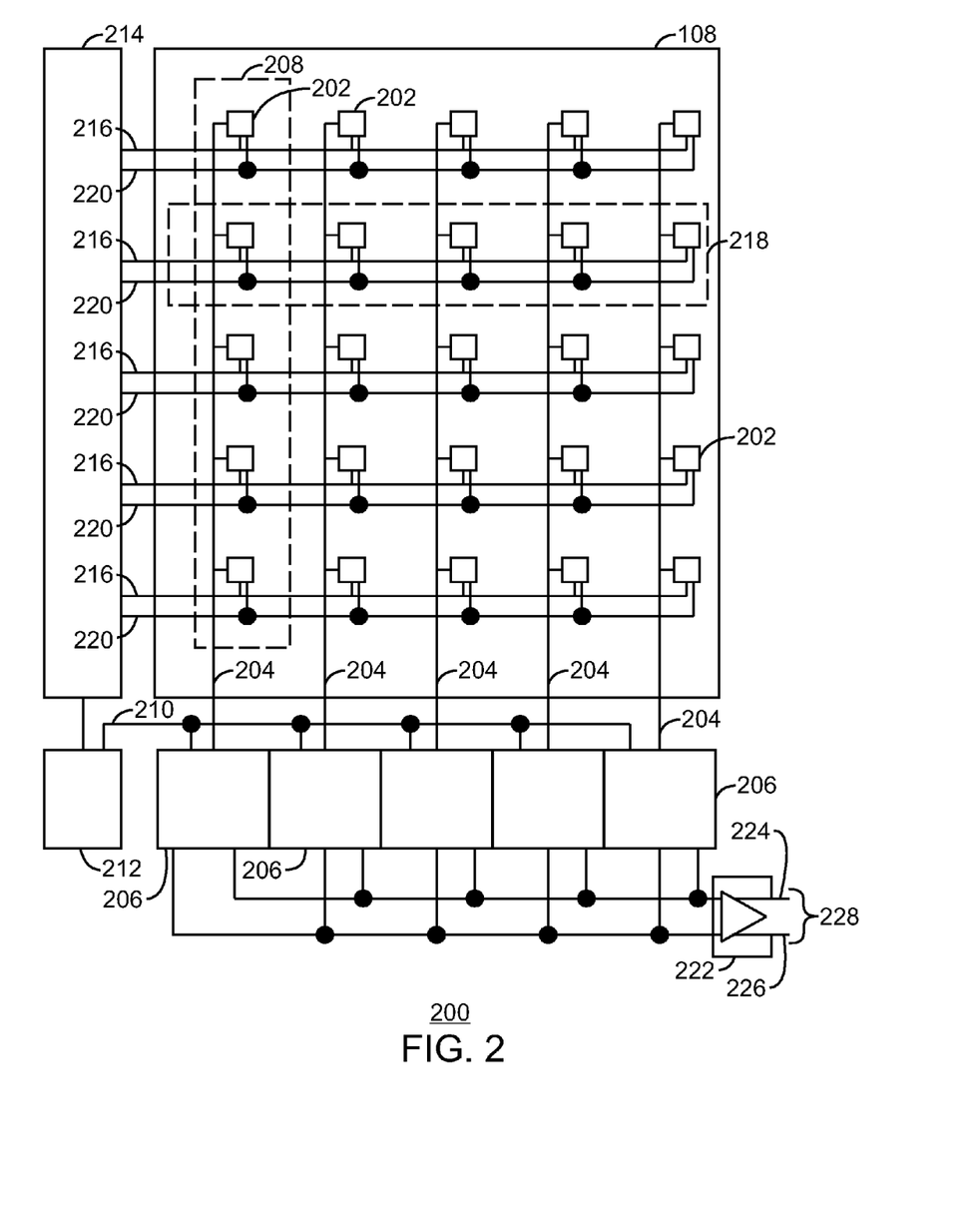
FIG. 2 is a block diagram of a detector, in accordance with exemplary embodiments of the present invention.

FIG. 2 is a block diagram of a detector 108, in accordance with exemplary embodiments of the present invention. In the detector 108 shown in FIG. 2, an array of APSs 202 is used to detect light reflected from an image. Each APS 202 is connected to a column readout line 204, which is connected to column capacitors 206. During readout of the array 202, an individual column 208 of APSs 202 may be selected for readout by control lines 210 from a vertical shift controller 212. As each column 210 is selected, the vertical shift controller 212 may activate a horizontal shift controller 214, which may then select a row of APSs 202.

The horizontal shift controller 214 may be connected to each APS 202 by two lines. A select line 216 from the horizontal shift controller 214 may activate a switch that places all of the APSs 202 in a horizontal row 218 in contact with their respective column readout lines 204. The column capacitors 206 for the selected APS 202 may then store a charge representing the image signal read from the APS 202. A reset line 220 from the horizontal shift controller 214 may be used to reset each APS 202 in a horizontal row 218 to a dark signal and the column capacitors 206 may then be used to store the dark signal.

In an amplifier 222, the image signal from the column capacitors 206 may be used to form an amplified image signal 224. Further, a dark, or reset, signal from the column capacitors 206 may be used to form an amplified reference signal 226. Together, the amplified image signal 224 and the amplified reference signal 226 form a difference signal 228 that may be corrected for noise caused by both the APS 202 and the capacitance of the various bus lines, such as the column readout lines 204.

The vertical shift controller 212 and the horizontal shift controller 214 may be programmed to control the electrical connections between the APSs 202, the column capacitors 206, and the amplifier 222 in accordance with exemplary embodiments of the present invention. In other embodiments, ROM 120, discussed with respect to FIG. 1, may contain a program that directs the processor to program different activation sequences into the vertical shift controller 212 and the horizontal shift controller 214 depending on ambient conditions. For example, the processor may program a first activation sequence for controlling the electrical connections to the APSs 202 in high light conditions and a second activation sequence for low light conditions.

The detector 108 is not limited to the configuration shown above. Indeed, any suitable combination of control lines or control units may be used in embodiments of the present invention to control the readout of the individual APSs 202 and are considered to be within the scope of the present invention. For example, each column 208 of APSs 202 may have an individual column amplifier.

Figure 3:
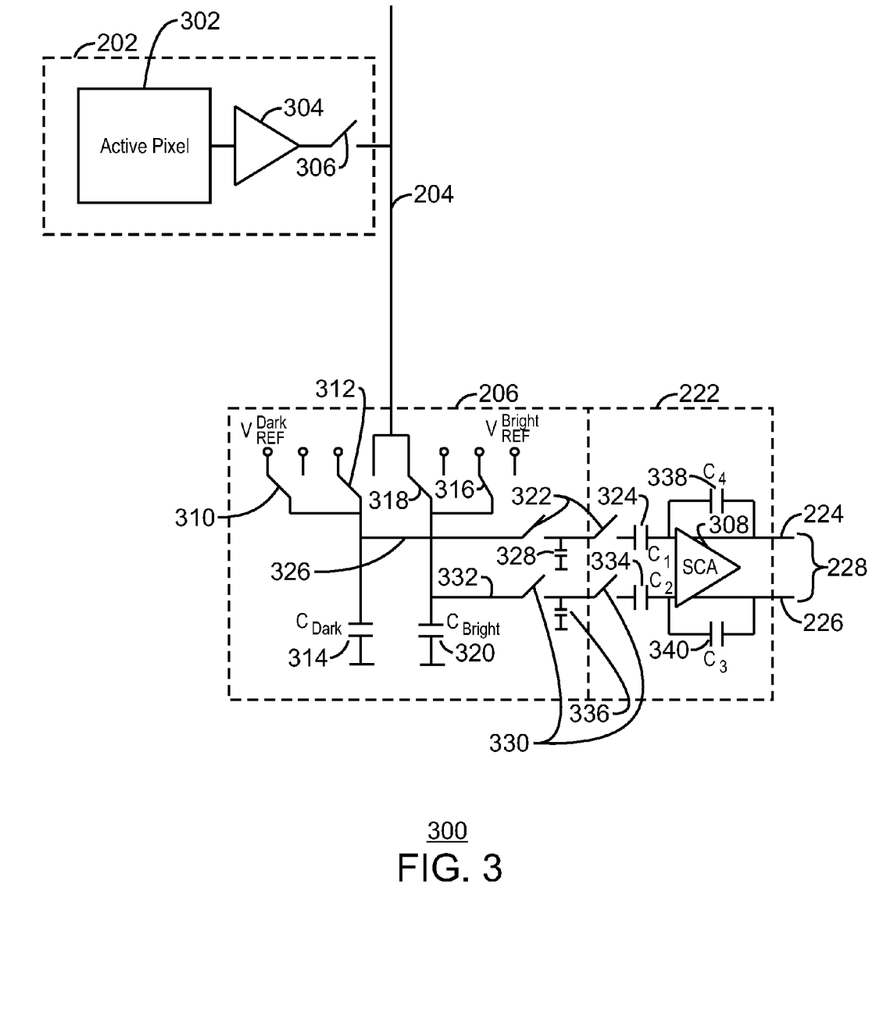
FIG. 3 is a circuit diagram of a column amplifier, in accordance with an exemplary embodiment of the present invention.

FIG. 3 is a circuit diagram of a single APS 202 connected by a column readout line 204 to column capacitors 206. The column capacitors 206 are connected in turn to the column amplifier 222. As shown in FIG. 3, the APS 202 may have an active pixel 302 which includes a detector and amplification circuitry generally including CMOS field-effect transistors, or CMOS FETs. A buffer 304, which may be a simple amplifier circuit, may be connected between the active pixel 302 and a select switch 306. The select switch 306 may be used by the horizontal shift controller to place the APS 202 into electrical contact with the column readout line 204. As used herein, each switch, such as the select switch 306, may also be a CMOS FET.

The column readout line 204 connects the APS 202 to the column capacitors 206. A series of switches associated with the column capacitors 206 are used to transfer the various signals to the amplifier 222, which may use a switched column amplifier, SCA 308, to form the difference signal 228. More specifically, a dark reference switch 310 and a dark signal switch 312 may be used to apply a dark reference voltage, $V_{Ref}^{Dark}$, or a dark signal, respectively, to a dark sample-and-hold capacitor 314. For example, in the position of the switches 310 and 312 shown in FIG. 3, $V_{Ref}^{Dark}$ is applied to the dark sample-and-hold capacitor 314. Similarly, a bright reference switch 316 and a bright signal switch 318 may be used to apply a bright reference voltage or an image signal, respectively, to a bright sample-and-hold capacitor 320. In the position of the switches 316 and 318 shown in FIG. 3, the image signal is applied to the bright sample-and-hold capacitor 320.

The dark sample-hold-capacitor 314 may be electrically connected to a dark input capacitor 324 on the SCA 308 through sampling switches 322 located in the line 326 between the capacitors 314 and 324. The line 326 has an associated parasitic capacitance 328 that may decrease the signal-to-noise. Similarly, sampling switches 330 located on the line 332 between the bright sample-and-hold capacitor 320 and the bright input capacitor 334 allow the capacitors 320 and 334 to be electrically connected. A parasitic capacitance 336 may also be associated with the line 332 joining the capacitors 320 and 334. As is generally known in the art, feedback capacitors 338 and 340 may be used to store an offset voltage for the SCA 308 during the amplification process. Although the sample-and-hold capacitors 314 and 320 are shown separately from the input capacitors 324 and 334, in an exemplary embodiment of the present invention the two functions may be combined into a single capacitor located on each input line 326 and 332 into the amplifier 222, as discussed further below.

Different operational schemes for the switches 306, 310, 312, 316, 318, 322, and 330 may be used to correct the differential output 228 from the amplifier 222 for noise. For example, the switches may be used to alternate between sampling the signals from the APS 202 and sampling the reference voltages to create signals that are compensated for noise from the APS 202. Two schemes that may be used for noise compensation are discussed with respect to FIGS. 4 and 5. As discussed with respect to FIG. 4, double sampling, or DS, may be used to correct for noise caused by parasitic capacitance, for example, parasitic capacitance 328 and 336 from the bus lines 326 and 332. As discussed with respect to FIG. 5, correlated double sampling, or CDS, may be used to correct for the reset noise caused by the APS 202.

Figure 4:
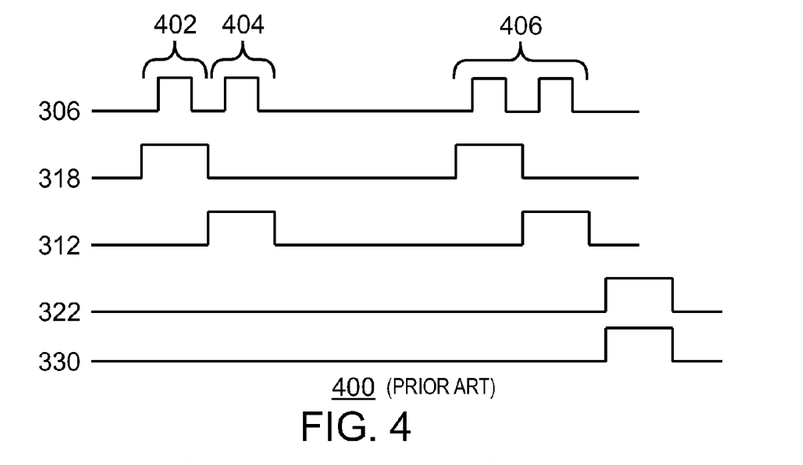
FIG. 4 is a diagram showing a readout scheme for correlated double sampling of an active pixel sensor.

FIG. 4 is a diagram showing a readout scheme for double sampling, or DS, of an APS 220. Referring also to FIG. 3, in this scheme, the reference switches 310 and 316 may be left "off," or in the open position, during this scheme. For sampling, the bright signal switch 318 may be set to "on," followed by setting the select switch 306 to "on," or the closed position, to sample the image signal from the APS 202 to the bright sample-and-hold capacitor 320, as indicated by reference numeral 402. After a time period of about 100 to 500 ns, the bright signal switch 318 may then be turned off and a reset signal may be switched on to the APS 202. The dark signal switch 312 may then be switched on to sample the dark signal to the dark sample-and-hold capacitor 314, as indicated by reference numeral 404. After about 100 to 500 ns, the reset signal and the dark signal switch 312 may be turned off to allow another sample of the image to be collected by the APS 202. The process may be repeated, as indicated by reference numeral 406. Repeating the process may make the values stored on the sample-and-hold capacitors 314 and 320 more closely match the actual values from the APS 202.

Once the sample-and-hold capacitors 314 and 320 are charged from the APS 202, the sampling switches 322 and 330 may be switched on to transfer the charge on the sample-and-hold capacitors 314 and 320 to the respective inlet capacitors 324 and 334 of the amplifier 222. DS compensates for the noise produced by the capacitance of the lines, such as noise from the parasitic capacitances 328 and 336 discussed with respect to FIG. 3, but does not compensate for noise from the APS 202.

Figure 5:
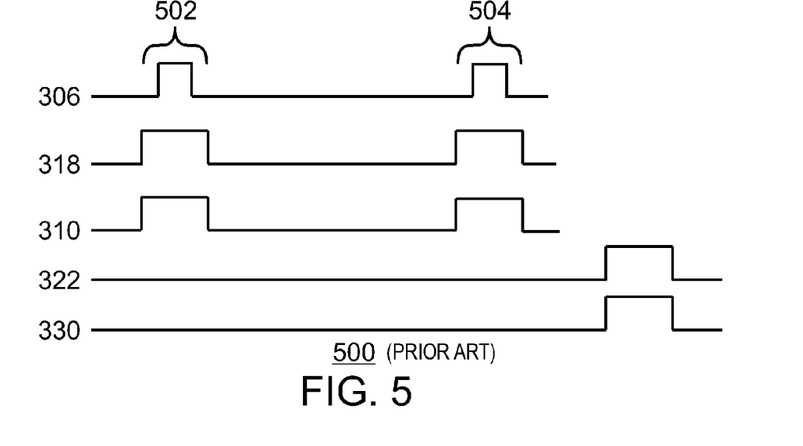
FIG. 5 is a diagram showing a readout scheme for digital double sampling of an active pixel sensor.

The noise created by the APS 202 may be corrected by sampling the reference voltages and correcting the signal values for the reference voltages. FIG. 5 is a diagram showing a readout scheme for correlated double sampling, or CDS, of an active pixel sensor. This sampling scheme may be used to correct for the noise produced by the APS 202. As generally indicated by reference numeral 502, during one half of the readout scheme, the bright signal switch 318 and the dark reference switch 310 are simultaneously switched on, after which the select switch 306 is switched on for about 100 to 500 ns. After about 100 to 500 ns, the select switch 306 is switched off and then the bright signal switch 318 and the dark reference switch 310 may then switched off. As indicated by reference numeral 504, the process may be repeated to increase the accuracy of the voltage stored on the sampleand-hold capacitors 314 and 320. This samples the image signal to the bright sample-and-hold capacitor 320 and $V_{Ref}^{Dark}$ to the dark sample-and-hold capacitor 314. The signals may then be sampled to the amplifier 222. The process is generally repeated using the dark signal switch 312 in place of the dark reference switch 310 and the bright reference switch 316 in place of the bright signal switch 310 to sample the bright reference voltage, $V_{Ref}^{Bright}$, and the dark signal.

Referring also to FIG. 3, in both of the modes above, the sample-and-hold capacitors 314 and 320 are charged during the sampling time of the column select, e.g., during the about 100 to 500 ns that the select switch 306 is in the closed position. After the sampling cycles shown in FIGS. 4 and 5 are completed, the readout of the values of the sample-and-hold capacitors 314 and 320 may be performed by switching them into contact with the inlet capacitors 324 and 334 of the amplifier 222 by switching the sampling switches 322 and 330 to on for about 100 to 500 ns.

However, the readout process may decrease the signal level that may be determined from the sample-and-hold capacitors 314 and 320. For example, when the readout of the bright sample-and-hold capacitor 320 starts, the sampling switches 330 are switched on. The charge in the bright sample-and-hold capacitor 320 will then distribute between the bright sample-and-hold capacitor 320 and the bright input capacitor 334. As a result, the charge is attenuated by $C_{Bright}/(C_2+C_{Bright})$, which may be only about 60% of the initial value. The charge of the dark sample-and-hold capacitor 314 will be similarly attenuated by being distributed between the dark sample-and-hold capacitor 314 and the dark input capacitor 324.

The attenuation of the charges may decrease the signal-to-noise during the readout process. More specifically, the pixel noise will sum with the noise from the SCA 308 according to equation (1).

$$n_{tot} = \sqrt{n_{pix}^2 + n_{SCA}^2} \quad (1)$$

Thus, when the pixel noise, $n_{pix}$, is attenuated the noise contribution from the SCA 308, $n_{SCA}$, increases. This decreases the overall noise performance of the detector. The attenuation may be even greater, due to parasitic capacitances 328 and 336 created by the lines 326 and 332 connecting the column capacitors 206 with the amplifier 222.

Figure 6:
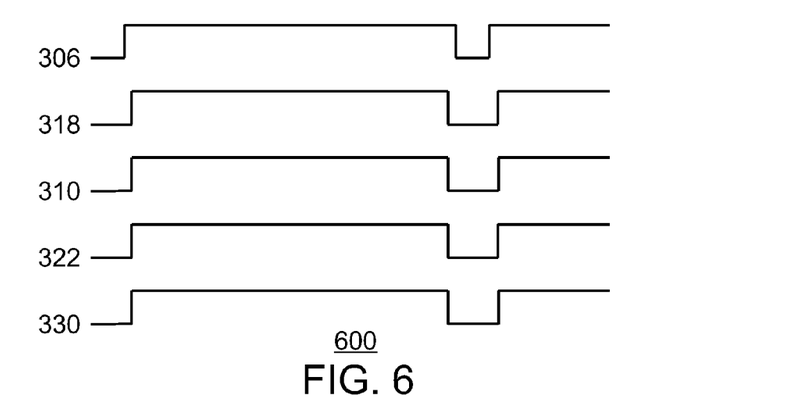
FIG. 6 is a diagram showing a readout scheme for overlapping the activation of the select switch with the bright signal switch and the bright sample switches for a longer period of time, in accordance with an exemplary embodiment of the present invention.

In an exemplary embodiment of the present invention, the select switch 306 may be operated in concert with the signal switches 312 and 318 and the sampling switches 322 or 330 to reduce the attenuation from the previous sampling schemes. For example, FIG. 6 is a diagram showing a readout scheme for overlapping the activation of the select switch 306 with the bright signal switch 318 and the bright sample switches 330 for a longer period of time, in accordance with an exemplary embodiment of the present invention. As shown in FIG. 6, the select switch 306 to an APS 202 may held in the on position for a longer period of time than in the previous readout schemes, e.g., about 500 to 1500 ns. The bright signal switch 318 and the bright sampling switches 330 may then be held in the on position for an overlapping period of time with the select switch 306, as shown in FIG. 6.

Accordingly, in the readout scheme shown in FIG. 6, the APS 202 may function as an active buffer, charging both the bright sample-and-hold capacitor 320 and the bright inlet capacitor 334 together. As the APS 202 is charging both capacitors together, the image signal on the inlet capacitor 334 is not attenuated from the initial charge on the bright sample-and-hold capacitor 320. During this same period, the dark reference switch 310 may be held on, charging both the dark sample-and-hold capacitor 314 and the dark inlet capacitor 324 to dark reference voltage, $VHF_{REF}^{Dark}$. As discussed above, the scheme may be repeated to sample the dark signal from the APS 202, by holding the dark signal switch 312 and the sample switches 322 in the on position. Further, the parasitic capacitances 336 and 328 are also charged during this period, reducing their effect on the signal.

Figure 7:
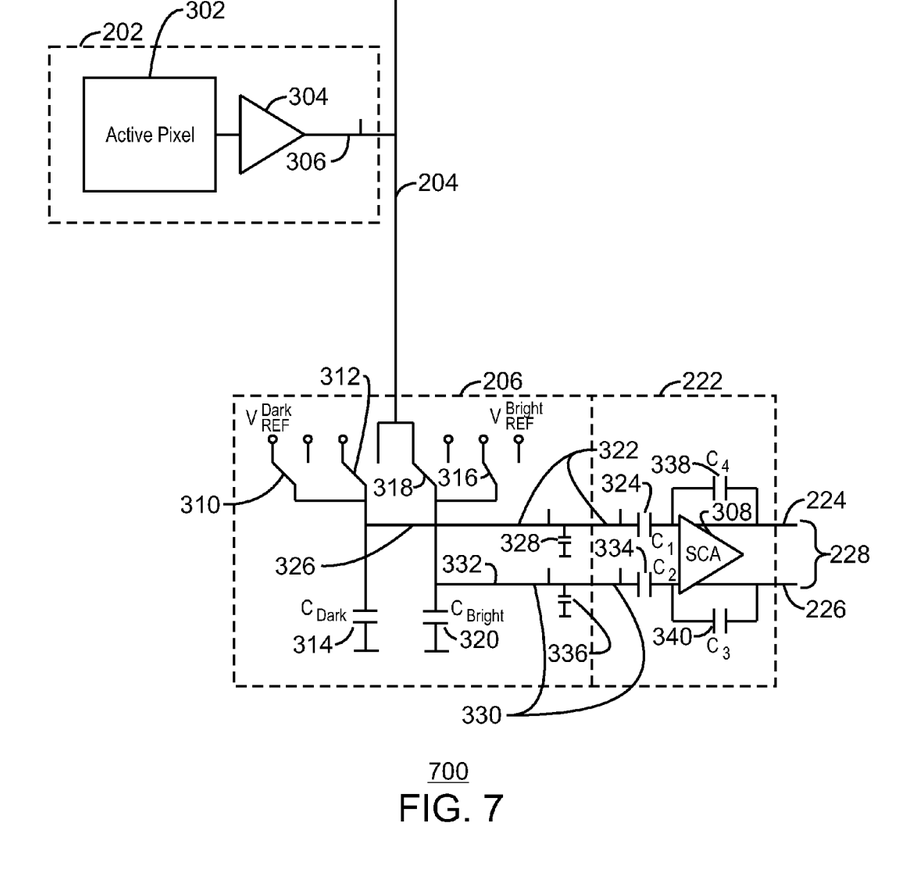
FIG. 7 is a circuit diagram of a column amplifier, showing an overlapping activation of the select switch and sampling switches during a readout operation, in accordance with an exemplary embodiment of the present invention.

The switch positions during the sampling periods shown in FIG. 6 may be more clearly seen in FIG. 7. FIG. 7 is a circuit diagram of a column amplifier, showing a readout scheme for overlapping the activation of the select switch 306 and sampling switches 330, in accordance with an exemplary embodiment of the present invention. As can be seen in this diagram, during each half of the sampling process, e.g., sampling of the bright signal from the APS 202, the select switch 306 is on at an overlapping time period as the bright signal switch 318 and the bright sampling switches 322. During this period, the APS 202 is simultaneously in electrical contact with both the bright sample-and-hold capacitor 320 and the bright input capacitor 334. Accordingly, the APS 202 may charge both of these capacitors 320 and 334, preventing the attenuation of the charge that would result from connection of the capacitors 320 and 334 to each other after the APS 202 is no longer connected by the sampling switch 306. In this embodiment the sample-and-hold capacitors 314 and 320 are simultaneously charged with the input capacitors 324 and 334, and are simultaneously sampled by the SCA 308. Thus, in an exemplary embodiment of the present invention, the input capacitors 324 or 334 may be eliminated by using the sample-and-hold capacitors 314 and 320 as both sampling capacitors and input capacitors.

The overlapping period of the connection between the APS 202 and the bright capacitors 320 and 334 or the dark capacitors 314 and 324 does not have to start and stop and stop at the same time. For example, in embodiments, the select switch 306 may be closed first, followed by the bright signal switch 318, placing the APS 202 in contact with the bright sample-and-hold capacitor 320. The bright sample switches 330 may then be closed to sample the signal to the bright inlet capacitor 334. The switches may then be opened in any order to disconnect the capacitors 320 and 334 from the APS 202. However, in other embodiments, any order may be used for making or breaking these connections, so long as a sample-and-hold capacitor 320 or 314 is in overlapping electrical contact with the APS 202 and the respective inlet capacitor 334 or 324.

Figure 8:
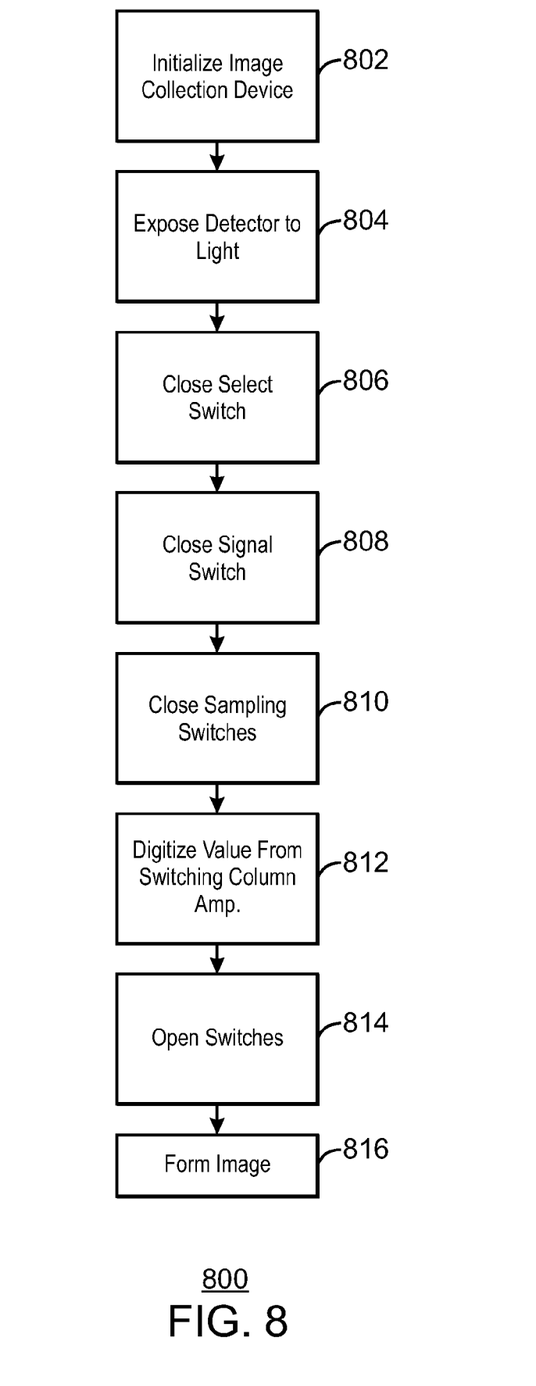
FIG. 8 is a process flow diagram of a method for forming an image, in accordance with an exemplary embodiment of the present invention.

FIG. 8 is a process flow diagram of a method 800 for forming an image, in accordance with an exemplary embodiment of the present invention. The method 800 begins at block 802 with the initialization of an image collection device. The initialization may be performed by switching on the device. Alternatively, the initialization may be performed by selecting a particular mode that operates the device in accordance with embodiments of the present invention. At block 804, a detector is exposed to light to collect the image. The detector may, for example, be an APS imager that includes APSs, as discussed with respect to FIGS. 2 and 3.

To readout the signal from each APS, at block 806, a select switch is closed to place the APS into contact with a column readout line. At block 808, a switch is closed to place the column readout line into electrical contact with a sample-and-hold capacitor. At block 810, sampling switches are closed to place the sample-and-hold capacitor and the APS into contact with an input capacitor on an amplifier. If the input capacitors have been eliminated, as discussed previously, closing the sampling switches places the APS into direct contact with the amplifier. The order of the closing of the switches is not limited to the order present above. Indeed, any order that brings the APS, the sample-and-hold capacitor, and the input capacitor on the amplifier into simultaneous electrical contact for any period of time is within the scope of the present invention.

After each sample-and-hold capacitor and each input capacitor, for the respective bright and dark signals, has been charged from the APS, at block 812 the ADC may digitize the amplified differential voltage from the amplifier, creating a digital signal representing the light detected by the active pixel sensor. At block 814, the sampling and select switches may be opened. The digital signal from the ADC may be combined with the digital signal measured for the other APSs in the APS imager to create a digital representation of the image at block 816. This digital representation may be used, for example, to create still images or video sequences, which may be displayed, printed, transmitted, or otherwise presented to a viewer.

The skilled person will appreciate that combining any of the above-recited features of the present invention together may be desirable.

The invention claimed is:

1. A method of forming an image using an active pixel sensor imager, comprising:
    placing an active pixel sensor in electrical contact with a column readout line;
    placing a sample-and-hold capacitor into electrical contact with the column readout line;
    placing the sample-and-hold capacitor in electrical contact with an input capacitor coupled between the sample-and-hold capacitor and an amplifier, wherein the input capacitor, the sample-and- hold capacitor, and the active pixel sensor are all in electrical contact for an overlapping period of time, and wherein the active pixel sensor charges the sample-and-hold capacitor and the input capacitor during the overlapping period of time;
    disconnecting the sample-and-hold capacitor from the amplifier;
    digitizing a differential output from the amplifier; and
    forming an image from the digitized output.

2. The method of claim 1, wherein the overlapping period of time is greater than 500 ns.

3. The method of claim 1, wherein placing the active pixel sensor in electrical contact with the column readout line comprises activating a CMOS FET that is operatively coupled between the active pixel sensor and the column readout line, allowing current to flow between the active pixel sensor and the column readout line.

4. The method of claim 1, further comprising displaying the image on a display incorporated into an image collection device.

5. The method of claim 1, further comprising transferring the image to an external device through a network interface controller.

6. An image collection system, comprising:
    an optical system configured to focus an image on a detector;
    the detector configured to convert the image into image data;
    a memory configured to store the image data for processing;
    a processor configured to perform calculations on the stored image data;
    a second memory comprising machine readable instructions configured to direct the processor to:
    place an active pixel sensor in electrical contact with a column readout line;
    place a sample-and-hold capacitor into electrical contact with the column readout line;
    place the sample-and-hold capacitor in electrical contact with an input capacitor coupled between the sample-and-hold capacitor and an amplifier, wherein the input capacitor, the sample-and-hold capacitor, and the active pixel sensor are in electrical contact for an overlapping period of time, and wherein the active pixel sensor charges the sample-and-hold capacitor and the input capacitor during the overlapping period of time;
    disconnect the sample-and-hold capacitor from the amplifier;
    digitize a differential output from the amplifier; and
    form an image from the digitized output.

7. The image collection system according to claim 6, wherein the detector comprises an active pixel sensor imager.

8. The image collection system according to claim 6, comprising a network interface controller configured to transfer images to an external device.

9. The image collection system according to claim 6, comprising a digital image storage device.

10. The image collection system according to claim 9, wherein the digital image storage device comprises a disk drive, a recordable optical disk, a digital tape, or any combinations thereof.

* * * * *